(12) United States Patent
Keithley et al.

(10) Patent No.: US 7,340,105 B2
(45) Date of Patent: Mar. 4, 2008

(54) METHOD AND APPARATUS FOR IMAGE PROCESSING

(75) Inventors: Douglas Gene Keithley, Boise, ID (US); Roy Gideon Moss, Palo Alto, CA (US)

(73) Assignee: Marvell International Technology Ltd., Hamilton (BM)

( * ) Notice: Subject to any disclaimer, the term of this patent is extended or adjusted under 35 U.S.C. 154(b) by 692 days.

(21) Appl. No.: 10/938,098

(22) Filed: Sep. 10, 2004

(65) Prior Publication Data

US 2006/0056725 A1    Mar. 16, 2006

(51) Int. Cl.
*G06K 9/40* (2006.01)

(52) U.S. Cl. ...................... 382/254; 382/205
(58) Field of Classification Search ............... 382/205, 382/254, 260, 261, 274
See application file for complete search history.

(56) References Cited

U.S. PATENT DOCUMENTS

| | | | |
|---|---|---|---|
| 5,329,599 A * | 7/1994 | Curry et al. | 382/266 |
| 5,559,951 A | 9/1996 | Lentz et al. | |
| 6,246,396 B1 | 6/2001 | Gibson et al. | |
| 6,407,736 B1 | 6/2002 | Regan | |
| 6,611,264 B1 | 8/2003 | Regan | |
| 6,665,454 B1 | 12/2003 | Silverbrook et al. | |
| 6,782,142 B2 * | 8/2004 | Loce et al. | 382/296 |
| 6,834,124 B1 * | 12/2004 | Lin et al. | 382/261 |

* cited by examiner

*Primary Examiner*—Phuoc Tran

(57) ABSTRACT

A method for image processing includes generating a pixel window of image data and determining whether the pixel window is stable or unstable. Image enhancement values are then obtained from a look up table for stable windows when the window is stable, and image enhancement values are obtained from a look up table for unstable windows when the window is unstable. An enhanced target pixel value is then output according to the obtained look up table image enhancement value.

20 Claims, 6 Drawing Sheets

800

| 1 | 1 | 1 |
|---|---|---|
| 1 | 1 | 1 |
| 0 | 0 | 0 |
| 0 | 0 | 0 |
| 0 | 0 | 0 |

| 0 | 0 | 0 |
|---|---|---|
| 0 | 0 | 0 |
| 0 | 0 | 0 |
| 1 | 1 | 1 |
| 1 | 1 | 1 |

| 1 | 0 | 0 |
|---|---|---|
| 1 | 1 | 0 |
| 1 | 1 | 0 |
| 1 | 1 | 1 |
| 0 | 1 | 1 |

FIG. 10

METHOD AND APPARATUS FOR IMAGE PROCESSING

TECHNICAL FIELD

The present invention relates generally to printers, and more particularly to a reduced look up table method and apparatus for image processing.

BACKGROUND ART

Printers have become very popular in recent times due to their greatly improved ability to print clear images. Generally, printers are available as monochrome only printers, such as printers that print only in gray and black, or color printers that print in color as well as monochrome. These printers operate by converting an image on a client device such as a personal computer into data that is received by a formatter that stores the data in the printer. The formatter generates coded data representing the image, which is then transmitted by the formatter to a print engine that drives the mechanisms of the printer to convert the data back into an image that is printed on a print medium, such as paper.

Printing devices that are used by computers and by computer-related devices, such as digital cameras, generally utilize a two-dimensional matrix of image elements or pixels. Each pixel in a color image matrix, for example, comprises a Red ("R"), Green ("G"), and Blue ("B") cell. Each such cell is represented by a corresponding memory cell that may store a numeric value. Memory cell values may typically be 8, 10, or 12 bits in size, or may be stored in any other convenient size. The memory cell values for the colors of each pixel may be stored separately in the computer memory, or may be merged into a single memory address location. A computer program can then cause a particular pixel to be printed in any visible color, or to appear black or white, by setting the numeric values of its red, green, and blue cells to appropriate values for the printer.

In many products and applications, some of the pixel information is generated or "interpolated" by a computer microprocessor ("CPU"), based on other information. This processing of the pixel information improves the overall quality of the printed image produced by the printer.

Depending upon the type of printer being utilized, the processing may be used, for example, to remove artifacts from the image that could cause problems, such as "toner explosion". ("Toner explosion" refers to toner that is scattered when moisture in the media suddenly vaporizes.) The processing may also be used to calibrate the image information for the printer to adjust for particular printer characteristics, so that the final printed image faithfully reproduces the original image. The processing can also be used to enhance the printed image to improve it over the original image, for example, by the removal of "red eye" in a photograph.

Such artifact removal, image enhancement, resolution enhancement, and so forth, is performed serially on the image data on a pixel-by-pixel basis. In one process, the pixels are individually "windowed" by selecting a small window or matrix of the pixels that surround the pixel that is being processed. The particular processing that is then performed on the selected (or "current" or "target") pixel is then based on the values of the surrounding pixels.

Unfortunately, the image enhancement information is not stored in memory in a manner that efficiently supports such pixel windowing processing. Instead, for each type of image enhancement, a complete table of all possible windows is stored in memory. The table serves as a look up table ("LUT"). The CPU then matches the window of the target pixel to a corresponding entry in the LUT to obtain instructions, from that matching LUT pattern, for optimizing the value of the target pixel. Each such LUT can therefore be very large and can require a very large amount of memory. For example, a full 5-row by 3-column LUT for one-bit data would have 32,768 entries. Because the processing must be performed very, very quickly, the LUT must be stored in very fast memory, such as CPU cache memory, not in the ordinary main memory. A standard CPU does not ordinarily have sufficient cache memory for such a large data table.

Thus, to support ever increasing printer operating speeds, prior solutions have resorted to increasingly expensive specialized hardware solutions, such as large, dedicated, high-speed memories (e.g., high-speed SRAMs). Such solutions, however, cause ever-increasing hardware and manufacturing costs, whereas the historical trend in the industry has been the opposite-declining costs accompanied by increasing performance.

Thus, a need still remains for faster, more efficient, more effective, and less expensive methods and mechanisms for optimizing memory utilization, especially processor cache memory utilization, for image processing. In view of the continuing increases in performance, capabilities, and customer expectations, accompanied by ever-increasing competition and declining prices, it is ever more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method for image processing. A pixel window of image data is generated and a determination is made whether the pixel window is stable or unstable. Image enhancement values are then obtained from a look up table for stable windows when the window is stable, and image enhancement values are obtained from a look up table for unstable windows when the window is unstable. An enhanced target pixel value is then output according to the obtained look up table image enhancement value.

Certain embodiments of the invention have other advantages in addition to or in place of those mentioned above. The advantages will become apparent to those skilled in the art from a reading of the following detailed description when taken with reference to the accompanying drawings.

BRIEF DESCRIPTION OF THE DRAWINGS

FIG. 8 is an example of the identification procedure for a Line Enhancement Bottom procedure;

FIG. 9 is an example of the identification procedure for a Line Enhancement Top procedure;

FIG. 10 is an example of the identification procedure for a Diagonal Line Edge Enhancement procedure;

BEST MODE FOR CARRYING OUT THE INVENTION

Figure 1:
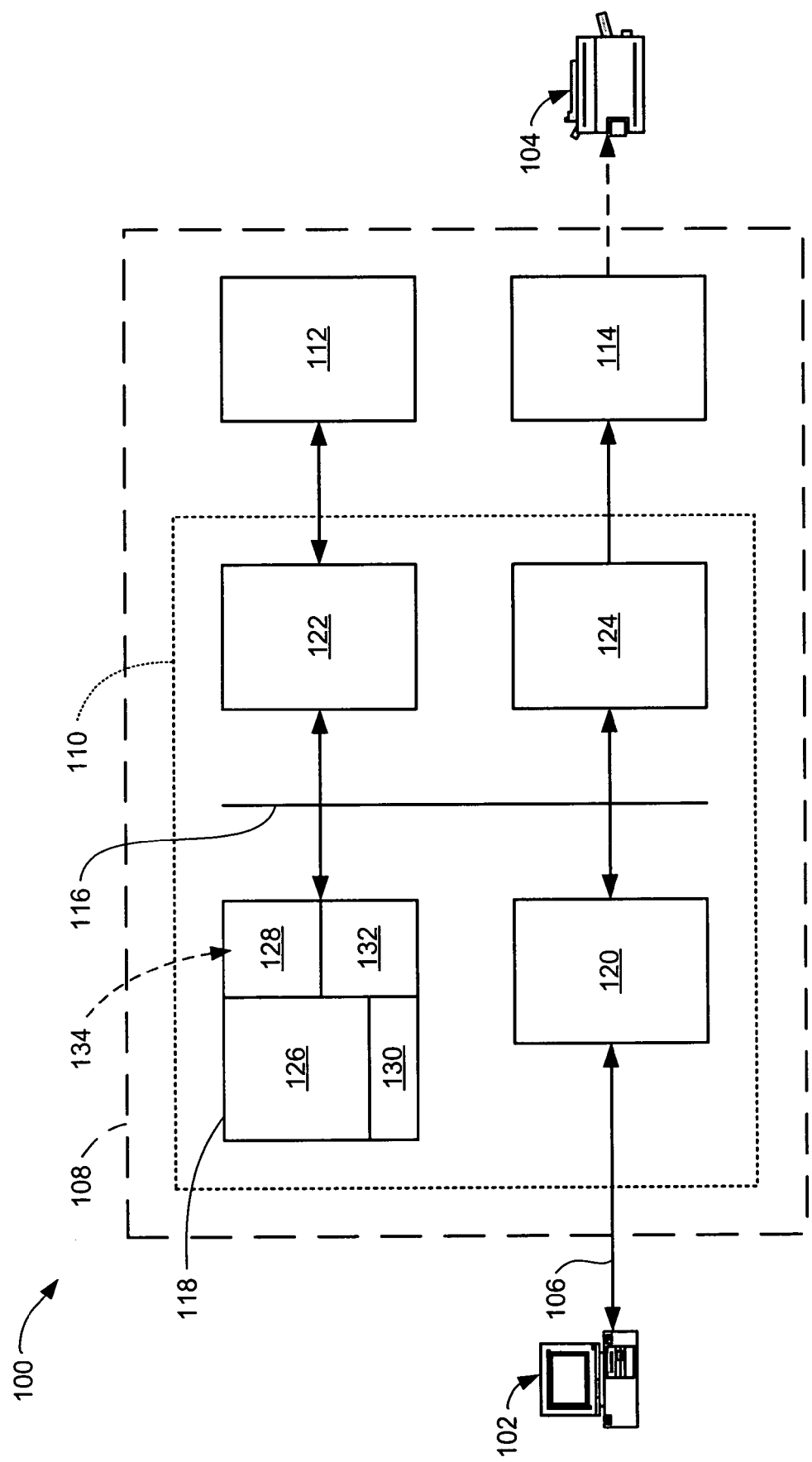
FIG. 1 is a block diagram of a printing system in accordance with an embodiment of the present invention.

In the following description, numerous specific details are given to provide a thorough understanding of the invention. However, it will be apparent to one skilled in the art that the invention may be practiced without these specific details. In order to avoid obscuring the present invention, some well-known circuits, system configurations, and processing steps are not disclosed in detail. Likewise, the drawings showing embodiments of the invention are semi-diagrammatic and not to scale and, particularly, some of the dimensions are for the clarity of presentation and are shown exaggerated in the FIGS. In addition, where multiple embodiments are disclosed and described having some features in common, for clarity and ease of illustration, description, and comprehension thereof, similar and like features one to another will ordinarily be described with like reference numerals.

As used herein, the term "printer" will be understood to encompass all image printing devices that receive a data stream representing an image and, from that data stream, print the represented image on a print medium, for example, a sheet of a paper. The term "print medium", as used herein, will be understood to encompass paper, paper-based products and sheets or planar sections of all other material on which an image may be printed. The term "print medium" will also be understood to encompass an intermediate transfer belt or similar device on which an image is built up before being transferred to another print medium.

Referring now to FIG. 1 therein is shown a block diagram of a printing system 100 in accordance with an embodiment of the present invention. The printing system 100 includes a printer client device 102, such as a personal computer (illustrated), a mainframe computer, a server, a scanner, a modem, a fax machine, a video camera, a security camera, a videocassette recorder, a digital videodisc, a laser disc player, a personal digital assistant, a wireless telephone, a mobile telephone, or any other device capable of generating or transmitting image data for printing. The printing system 100 also includes a printer 104, which can be a monochrome or color printer.

A connection 106 is provided between the printer client device 102 and the printer 104 over which the printer client device 102 can transmit image data in the form of print jobs to the printer 104. The connection 106 may be a direct serial or parallel connection between the printer client device 102 and the printer 104. Alternatively, the connection 106 may be over a local area network ("LAN") or a wide area network ("WAN"). The connection 106 may also be a wireless connection or any other connection over which data can be transferred from the printer client device 102 to the printer 104.

The printer client device 102 customarily runs an application that generates image data representing an image that is to be printed. The image data is transmitted to a client printer driver that also customarily runs on the printer client device 102. The client printer driver configures the image data into a form appropriate for transmission to the printer 104 through the connection 106.

The image data is received by a printer formatter board 108 located within the printer 104 (but shown externally in FIG. 1 for clarity of illustration). The printer formatter board 108 provides processing circuitry that formats the image from the printer client device 102 for printing on the printer 104. The formatting of the image will typically include pixel-by-pixel processing of the image elements to optimize the image according to the particular characteristics of the printer 104. Such enhancement, for example, may include artifact removal (e.g., toner explosion), single dot enhancement, line enhancement, contrast enhancement, color enhancement, resolution enhancement, and so forth.

Included on the printer formatter board 108 is an integrated circuit 110 for performing the processing of the image data for the printer 104. Because such integrated circuits are usually customized for the particular printer characteristics, the integrated circuit 110 is commonly an application specification integrated circuit ("ASIC"). The printer formatter board 108 will also include additional elements such as a main memory 112 and an internal printer driver 114.

The integrated circuit 110 includes an internal bus 116 that connects a microprocessor 118, a host interface controller 120, a memory controller 122, and a video controller 124. The microprocessor 118 includes a processor 126, a data cache 128, customized instructions 130, and an instruction cache 132. The memory controller 122 connects to and controls the main memory 112. The host interface controller 120 connects to the printer client device 102 through the connection 106. The video controller 124 provides the output from the integrated circuit 110 to the internal printer driver 114 for communication to and control of the specific printing hardware in the printer 104.

In the operation of one embodiment of the printer formatter board 108, for example, a full page of the data that is to be printed will be transmitted by the printer client device 102 through the connection 106 to the integrated circuit 110 and stored as a single contiguous image in the main memory 112 of the printer formatter board 108. In another embodiment, the page to be printed is transmitted from the printer client device 102 in multiple compressed "strips". Before being printed, the strips are decompressed by the microprocessor, or by a dedicated decompressor that stores the data back into the main memory 112, or by in-line decompression blocks in the video print path. The microprocessor 118 then reads the stored image data from the main memory 112, processes it pixel by pixel, and then stores the processed data back into the main memory 112. At the appropriate time, the video controller 124 then takes the processed data from the main memory 112 and sends it out for printing to the printer 104.

Certain pixel-by-pixel image processing procedures may utilize a look up table ("LUT") for quickly and consistently specifying the changes that are to be made to particular pixel values. One such LUT layout, for example, utilizes a 5 row by 3 column LUT in which the selected pixel to be processed (the "target" pixel) is in the center, surrounded by its neighboring pixels. The values of the neighboring pixels are then matched to a pattern in the LUT, and that matching LUT pattern then specifies the enhancement value to be given to the target pixel.

Figure 2:
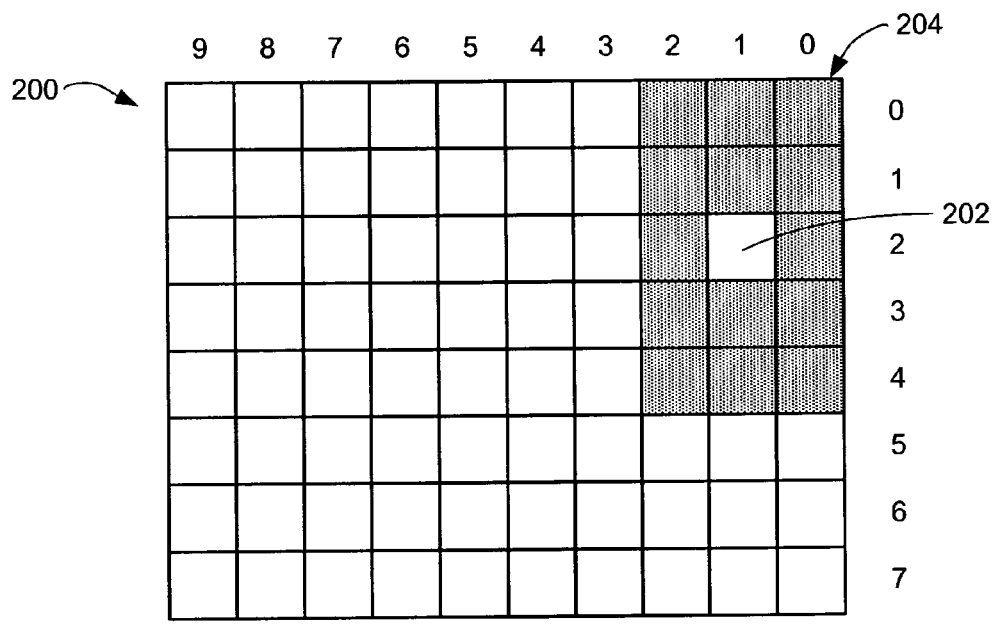
FIG. 2 is a representation of a portion of the image pixels at the commencement of the processing of the pixels.

Referring now to FIG. 2, therein is shown a representation of a portion 200 of the image pixels at the commencement of the processing of the pixels. Thus, a target pixel 202 is shown surrounded by a pixel window 204 of dimension 5 rows by 3 columns.

Figure 3:
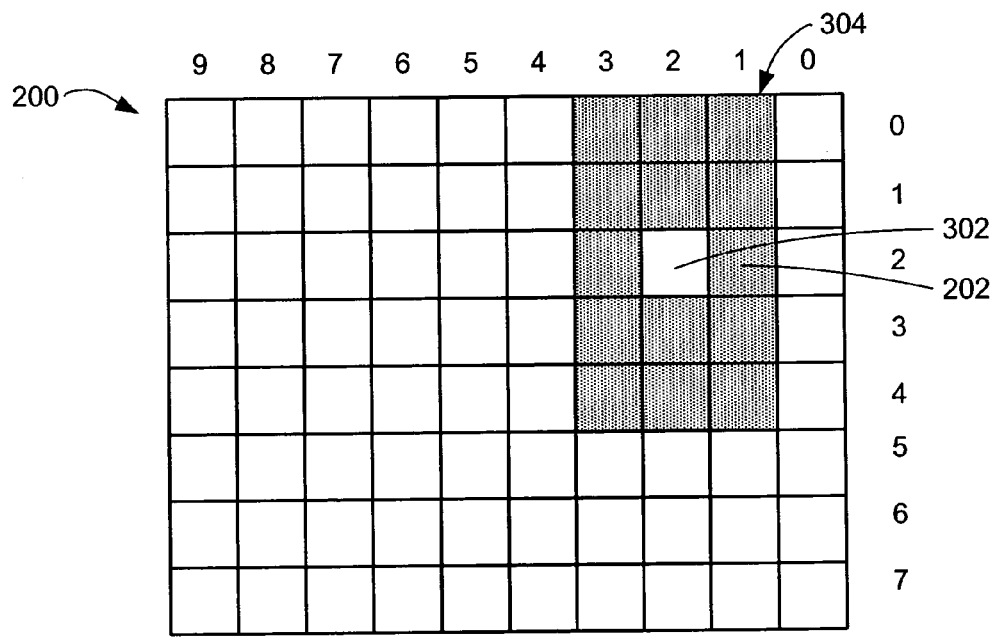
FIG. 3 is a representation of the FIG. 2 image portion following processing of the target pixel in FIG. 2 and commencement of the processing of a target pixel in an indexed pixel window.

Referring now to FIG. 3, therein is shown a representation of the same portion 200 of the image pixels following processing of the target pixel 202 and commencement of the processing of a target pixel 302 in an indexed pixel window 304 of the same dimensions. A comparison of FIG. 3 with FIG. 2 shows that the pixel window 304 in FIG. 3 has indexed or stepped over one column from the position of the pixel window 204 shown in FIG. 2. The pixels themselves in both FIGS. are identical since the results of the processing of the target pixels are stored and buffered in a separate memory location as the pixel processing progresses through the image data.

The LUT for pixel windows, such as the pixel windows 204 (FIG. 2), can be quite large. For example, to implement a full 5-row by 3-column LUT for one-bit data, there would be 32,768 ($2^{15}$) entries. Enabling a pattern replacement also based on a single bit from both the row and column locations would quadruple (to $2^{17}$) the number of entries in such a table.

It has been discovered that certain image processing procedures have patterns that have constant (i.e., unchanging) values in several of the rows. For example, toner explosion, line enhancement, and single dot enhancement patterns have constant values in four of the five rows. It has thus been discovered that a significant reduction can be made in the number of LUT entries by adding a signal to indicate this "constant row values" condition. This enables the number of table entries to be significantly and substantially reduced. In the example given, for instance, where four of the five rows have constant values, the number of entries can be reduced by a factor of 128 (from $2^{17}$ to $2^{10}$). Such a reduced LUT can easily fit into even a small amount of processor cache, thus enabling significant speed improvements to firmware image processing using conventional computer microprocessors ("CPUs"). This is indicated by an LUT arrow 134 in FIG. 1, indicating that the entire LUT is loaded into and located within the data cache 128 of the microprocessor 118.

To generate the scanning operation for processing the pixel values (as described with respect to FIGS. 2 and 3), a row and column counter may be used to keep track of the target pixel position. These counters may be conveniently incremented and indexed according to the scanning and processing patterns being implemented. For example, one such process is described with respect to FIG. 11 herein.

Figure 4:
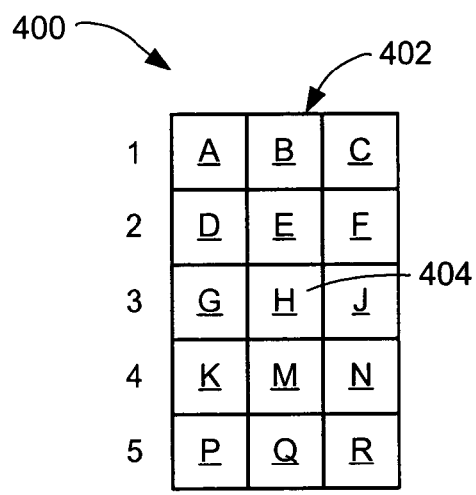
FIG. 4 illustrates an identification procedure for classifying a pixel window according to the presence of constant row values.

Referring now to FIG. 4, therein is illustrated an identification procedure 400 for determining whether a particular pixel window, such as the pixel window 204 (FIG. 2) or the indexed pixel window 304 (FIG. 3), is to be classified as having such constant row values, or not. When the pixel window meets the criteria that are set for such a constant row value classification, it is referred to as "stable". If it does not meet the set criteria for constant row values, it is referred to as "unstable".

Alternatively, as will be clear to one of ordinary skill in the art based upon the teachings herein, constant column rather than row values, or combinations of both, can be utilized for the stable and unstable classifications. Based on this disclosure, it will be clear that the particular definition and the row and column criteria for distinguishing "stable" and "unstable" pixel windows will therefore be selected according to the specific processing and resources at hand.

In one embodiment, as depicted with respect to FIGS. 4-9, the classification of the pixel windows is performed as follows. Referring again to FIG. 4, a pixel window 402 is depicted having a target pixel 404 in the center thereof referred to as "H", with the pixels surrounding the target pixel 404 being identified by the letters A, B, C, D, E, F, G, J, K, M, N, P, Q, and R.

The LUT index for the pixel window 402 is then generated based on whether the data in rows 1, 2, 4, and 5 is stable or not. In this embodiment, a pixel window is "stable" when:

[(A=B)&(B=C) & (D=E)&(E=F) & (K=M)&(M=N) & (P=Q)&(Q=R)].

The LUT address is then defined two ways:

If stable:

LUTaddress={1, {A, D, K, P}, {G, H, J}, row[0], col[0]}

Else it is unstable:

LUTaddress={0, {D, E, F}, {G, H, J}, {K, M, N}}

The composite or consolidated LUT for 4-bit image enhancement values would be a $2^{10} \times 4$ bit table (i.e., 512 byte). For 2-bit image enhancement values the LUT would be a $2^{10} \times 2$ bit table (i.e., 256 byte). Then, by using these LUT addresses, the corresponding matching window patterns in the LUT will be speedily accessed and found, and will specify and provide the image enhancement values for the target pixels. The CPU then applies these values to the target pixels as the processing proceeds (cf. the flow chart 1100 in FIG. 11), periodically writing the new values back to the main memory 112.

The following examples, in FIGS. 5-9, of image enhancement procedures, are but a few examples of the many known enhancement methods and systems that are regularly utilized and employed in image processing for image printing and/or display. Accordingly, it will be understood that these enhancement procedures are exemplary only and that the present invention is not limited to just these particular enhancement procedures. Also, the term "enhancement" will be understood to refer to improving the final image, and therefore includes removal of artifacts, such as "red-eye" or toner explosion, as well as the addition of features, such as contrast improvement. Also, the term "image enhancement values" will be understood to refer to the numerical values applied to a particular image feature for the improvement thereof, as is well understood in the art.

Figure 5:
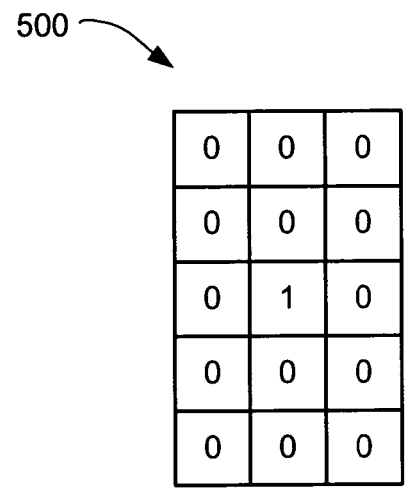
FIG. 5 is an example of the identification procedure for a Single Dot enhancement procedure.

Referring now to FIG. 5, therein is shown an example 500 of the identification procedure 400 (FIG. 4) applied to a Single Dot enhancement procedure. The actual pixel values (0 or 1) are presented in each of the pixel cells in the example 500. The example 500 is stable, and the LUT address of the example 500 is then given by: "1,0000,010, [row], [column]".

Figure 6:
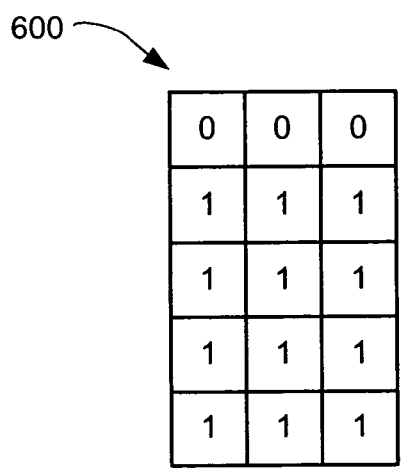
FIG. 6 is an example of the identification procedure for a Toner Explosion Top enhancement procedure.

Referring now to FIG. 6, therein is shown an example 600 of the identification procedure 400 (FIG. 4) applied to a Toner Explosion Top enhancement procedure. The actual pixel values (0 or 1) are presented in each of the pixel cells in the example 600. The example 600 is stable, and the LUT address of the example 600 is then given by: "1,0111,111, [row],[column]".

Figure 7:
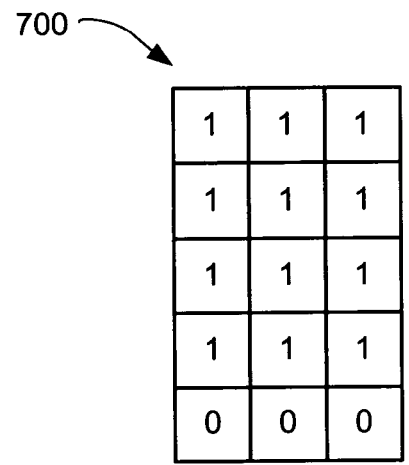
FIG. 7 is an example of the identification procedure for a Toner Explosion Bottom enhancement procedure.

Referring now to FIG. 7, therein is shown an example 700 of the identification procedure 400 (FIG. 4) applied to a Toner Explosion Bottom enhancement procedure. The actual pixel values (0 or 1) are presented in each of the pixel cells in the example 700. The example 700 is stable, and the LUT address of the example 700 is then given by: "1,1110, 111,[row],[column]".

Referring now to FIG. 8, therein is shown an example 800 of the identification procedure 400 (FIG. 4) applied to a Line Enhancement Bottom procedure. The actual pixel values (0 or 1) are presented in each of the pixel cells in the example 800. The example 800 is stable, and the LUT address of the example 800 is then given by: "1,1100,000,[row],[column]".

Referring now to FIG. 9, therein is shown an example 900 of the identification procedure 400 (FIG. 4) applied to a Line Enhancement Top procedure. The actual pixel values (0 or 1) are presented in each of the pixel cells in the example 900. The example 900 is stable, and the LUT address of the example 900 is then given by: "1,0011,000,[row],[column]".

Referring now to FIG. 10, therein is shown an example 1000 of the identification procedure 400 (FIG. 4) applied to a Diagonal Line Edge Enhancement procedure. The actual pixel values (0 or 1) are presented in each of the pixel cells in the example 1000. The example 1000 is unstable, and the LUT address of the example 1000 is then given by: "0,110, 110,111".

Figure 11:
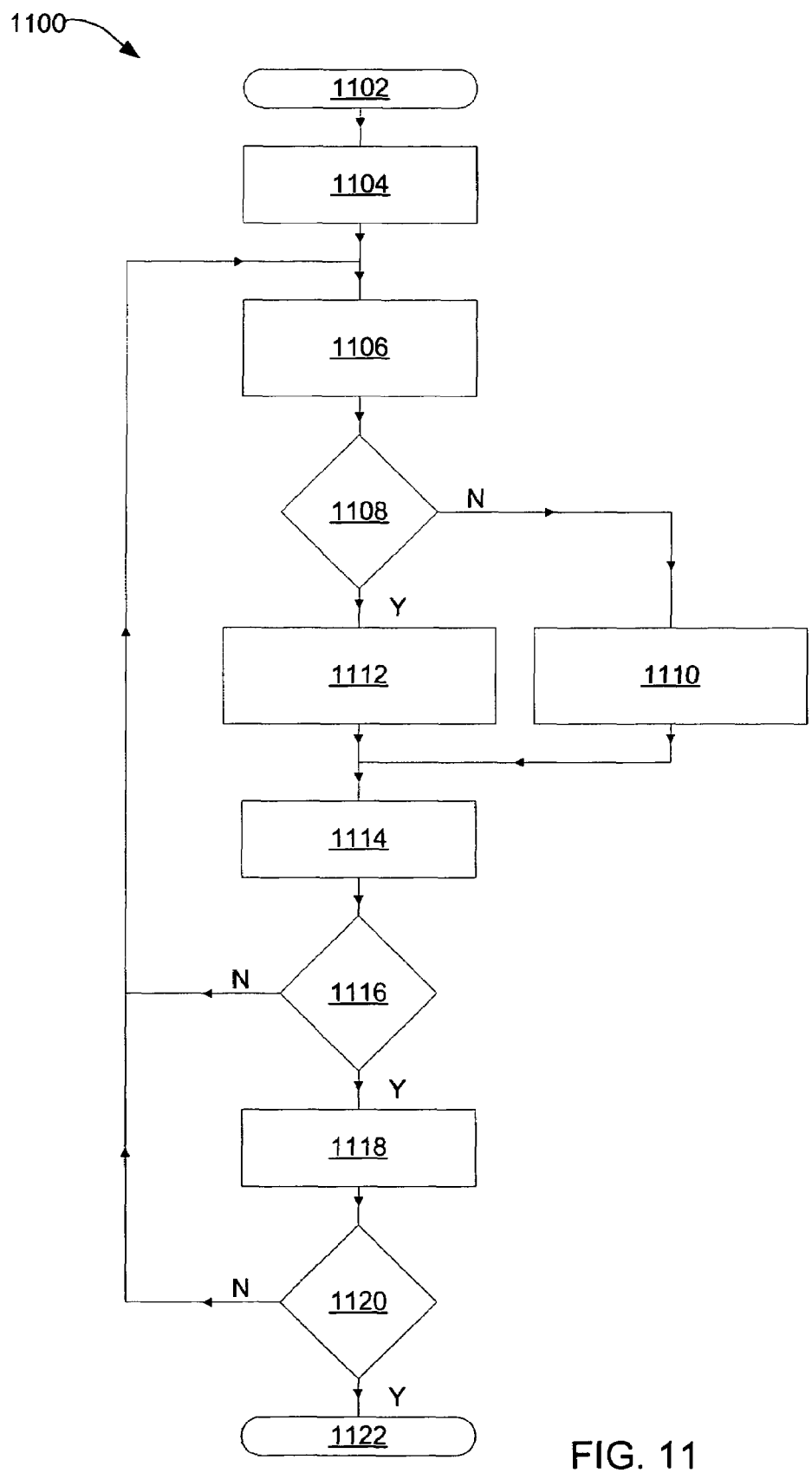
FIG. 11 is a flow chart of an embodiment of the method for printer image processing according to the present invention.

Referring now to FIG. 11, therein is shown a flow chart 1100 of an embodiment of the method for printer image processing according to the present invention. The flow chart 1100 begins with a block 1102 that represents the start of the processing of a page of image data. Next, in a block 1104, the row and column counters are reset to 1.

Then, in a block 1106, a window of data, such as the pixel window 204 (FIG. 2) or the indexed pixel window 304 (FIG. 3), is generated.

A decision is then made, in a decision block 1108, whether the window that was generated in the block 1106 is stable or unstable. If unstable, the decision line N is followed to a block 1110 where a table of unstable windows is consulted for a match. Corresponding instructions are then retrieved for processing the related target pixel (such as, for example, the target pixel 202 (FIG. 2) or the target pixel 302 (FIG. 3)).

If the decision in the decision block 1108 is that the window is a stable data type, then the decision line Y is follow to a block 1112, where a table of stable windows is consulted according to the window's LUT address. Corresponding instructions are then retrieved for processing the related target pixel (such as, for example, the target pixel 202 (FIG. 2) or the target pixel 302 (FIG. 3)).

Next, in a block 1114, the column position is incremented. Then, in a block 1116, a check is made to determine if the column has been incremented to the last column. If the column has not moved to the last column, decision line N is followed and the process is returned to the block 1106. If the column has incremented to the last column, decision line Y is followed to a block 1118 in which the column is reset to 1 and the row is incremented by 1.

Next, in a block 1120, a check is made to determine whether the last row has been reached. If not, decision line N is followed to return the process to the block 1106. If the last row has been reached in the block 1120, the decision line Y is followed to a block 1122 in which the page processing is ended.

During the image processing as described with respect to the flow chart 1100, the enhanced image resulting from the processing of the target image pixels has been periodically written back to the main memory 112 (FIG. 1). Following the end of the page processing in the block 1122, the enhanced image in the main memory 112 is then transmitted to the printer 104 (FIG. 1) for printing. Depending upon the image enhancing sequence, it is also possible to commence the page printing before the page processing has fully completed.

It has been discovered that the present invention thus has numerous advantages. A major advantage is the significant reduction in the net size of the LUT through the use of stable addresses for pixel windows that share common and constant values in multiple rows and/or columns thereof.

Another advantage is that the present invention is significantly extensible. Thus, for example, identification of stable windows provides for regional solutions in which larger blocks of pixels can be replaced with larger patterns. For example, a gray-scale rendering can be achieved by replacing the pixels in a checkerboard pattern on an alternating row and column basis.

Still another advantage of the present invention is that it is not limited just to use in printers, but can also be beneficially applied to image processing for the full range of image generation and display technologies. Thus, for example, in addition to use in printers, the present invention can also be used for image processing in display devices such as computer displays, cell phones, video cameras, personal digital assistants, and so forth.

Figure 12:
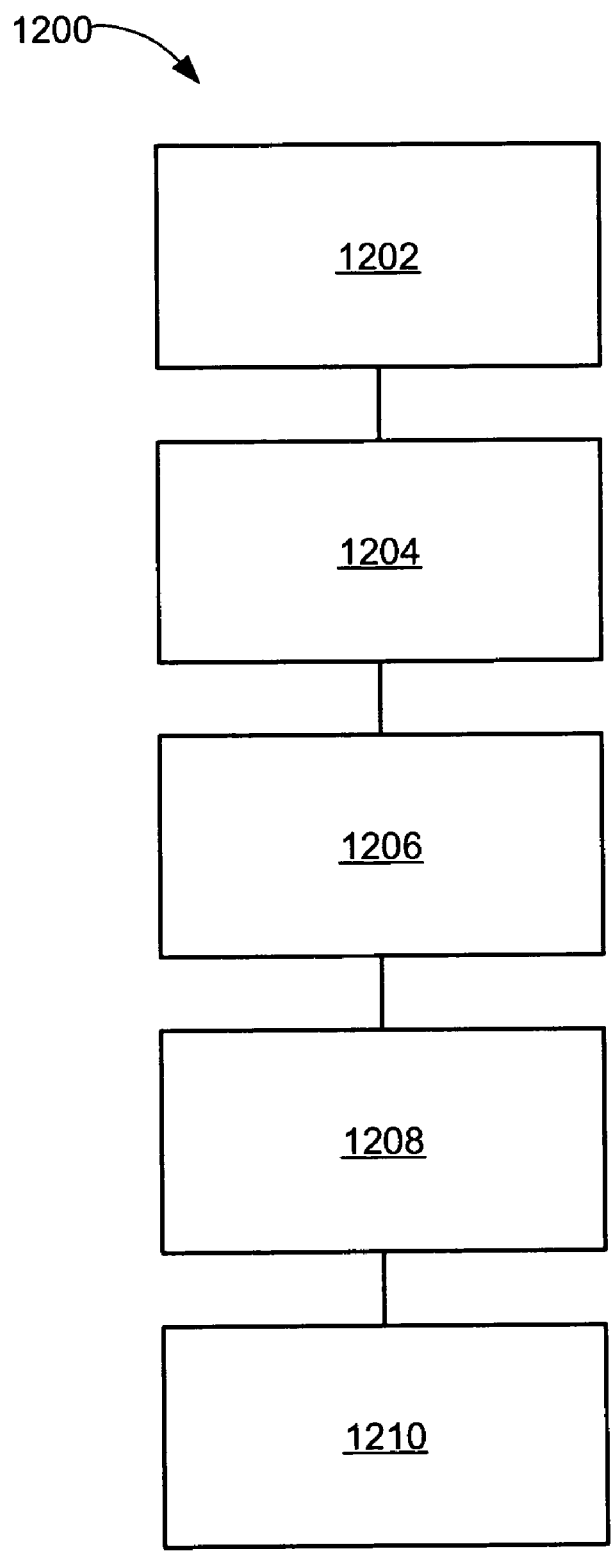
FIG. 12 is a flow chart of a method for printer image processing in accordance with the present invention.

Referring now to FIG. 12, therein is shown a flow chart of a method 1200 for image processing in accordance with the present invention. The method 1200 includes generating a pixel window of printer image data, in a block 1202; determining whether the pixel window is stable or unstable, in a block 1204; obtaining image enhancement values from a look up table for stable windows when the window is stable, in a block 1206; obtaining image enhancement values from a look up table for unstable windows when the window is unstable, in a block 1208; and outputting an enhanced target pixel value according to the obtained look up table image enhancement value, in a block 1210.

Thus, it has been discovered that the reduced LUT image processing method and apparatus of the present invention furnish important and heretofore unknown and unavailable solutions, capabilities, and functional advantages for significantly improving printer, image generation, and display operating speeds while significantly decreasing manufacturing costs. The resulting configurations and implementations are straightforward, economical, uncomplicated, highly versatile and effective, can be implemented by adapting known technologies, and are thus readily suited for economically manufacturing improved, faster-operating printing and display devices using conventional manufacturing processes and technologies.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein or shown in the accompanying drawings are to be interpreted in an illustrative and non-limiting sense.

The invention claimed is:

1. A method for image processing, comprising:
generating a pixel window of image data;
determining whether the pixel window is stable or unstable;
obtaining image enhancement values from a look up table for stable windows when the window is stable;
obtaining image enhancement values from a look up table for unstable windows when the window is unstable; and outputting an enhanced target pixel value according to the obtained look up table image enhancement value.

2. The method of claim 1 wherein the pixel window is determined to be stable when the pixel patterns therein have constant values in a plurality of the pixel window rows.

3. The method of claim 1 wherein:
the pixel window is 5 rows by 3 columns; and
the pixel window is determined to be stable when the pixel patterns therein have constant values in a plurality of the pixel window rows.

4. The method of claim 1 wherein:
the pixel window is 5 rows by 3 columns; and
the pixel window is determined to be stable when the pixel patterns therein have constant values in 4 of the 5 pixel window rows.

5. The method of claim 1 further comprising storing the entire look up tables for the stable and unstable windows in the memory cache of a computer microprocessor.

6. The method of claim 1 wherein:
the look up table address for stable windows has the form: {1, {A, D, K, P}, {G, H, J}, row[0], col[0]}; and
the look up table address for unstable windows has the form: {0, {D, E, F}, {G, H, J}, {K, M, N}}.

7. The method of claim 1 wherein the look up tables include an enhancement procedure selected from a Single Dot enhancement procedure, a Toner Explosion Top enhancement procedure, a Toner Explosion Bottom enhancement procedure, a Line Enhancement Bottom procedure, a Line Enhancement Top procedure, and a combination thereof.

8. A method for image processing, comprising:
generating a pixel window of printer image data;
determining whether the pixel window is stable or unstable;
providing a look up table of image enhancement information for stable and for unstable pixel windows;
determining look up table addresses for corresponding matching window patterns;
obtaining image enhancement values from the look up table for stable data when the window is stable;
obtaining image enhancement values from the look up table for unstable data when the window is unstable;
outputting an enhanced target pixel value according to the obtained look up table image enhancement value; and
printing an enhanced image using the enhanced target pixel values.

9. The method of claim 8 wherein the pixel window is determined to be stable when the pixel patterns therein have constant values in a plurality of the pixel window rows.

10. The method of claim 8 wherein:
the pixel window is 5 rows by 3 columns; and
the pixel window is determined to be stable when the pixel patterns therein have constant values in a plurality of the pixel window rows.

11. The method of claim 8 wherein:
the pixel window is 5 rows by 3 columns; and
the pixel window is determined to be stable when the pixel patterns therein have constant values in 4 of the 5 pixel window rows.

12. The method of claim 8 further comprising storing the entire look up tables for the stable and unstable data in the memory cache of a computer microprocessor.

13. The method of claim 8 wherein:
the look up table address for stable data has the form: {1, {A, D, K, P}, {G, H, J}, row[0], col[0]}; and
the look up table address for unstable data has the form: {0, {D, E, F}, {G, H, J}, {K, M, N}}.

14. A system for image processing, comprising:
processing circuitry for generating a pixel window of image data;
processing circuitry for determining whether the pixel window is stable or unstable;
a look up table having image enhancement values for stable windows;
a look up table having image enhancement values for unstable windows; and
processing circuitry for outputting an enhanced target pixel value from the look up table image enhancement values according to the determination of whether the pixel window is stable or unstable.

15. The system of claim 14 wherein the pixel window is stable when the pixel patterns therein have constant values in a plurality of the pixel window rows.

16. The system of claim 14 wherein:
the pixel window is 5 rows by 3 columns; and
the pixel window is stable when the pixel patterns therein have constant values in a plurality of the pixel window rows.

17. The system of claim 14 wherein:
the pixel window is 5 rows by 3 columns; and
the pixel window is stable when the pixel patterns therein have constant values in 4 of the 5 pixel window rows.

18. The system of claim 14:
further comprising a computer microprocessor having a memory cache; and
wherein the entire look up tables for the stable and unstable windows are stored in the memory cache of the computer microprocessor.

19. The system of claim 14 wherein:
the look up table address for stable windows has the form: {1, {A, D, K, P}, {G, H, J}, row[0], col[0]}; and
the look up table address for unstable windows has the form: {0, {D, E, F}, {G, H, J}, {K, M, N}}.

20. The system of claim 14 wherein the look up tables further comprise an enhancement procedure selected from a Single Dot enhancement procedure, a Toner Explosion Top enhancement procedure, a Toner Explosion Bottom enhancement procedure, a Line Enhancement Bottom procedure, a Line Enhancement Top procedure, and a combination thereof.

* * * * *